(12) United States Patent
Chipper

(10) Patent No.: US 9,465,144 B2
(45) Date of Patent: Oct. 11, 2016

(54) HYBRID GRIN DIFFRACTIVE OPTICS

(71) Applicant: RAYTHEON COMPANY, Waltham, MA (US)

(72) Inventor: Robert B. Chipper, Allen, TX (US)

(73) Assignee: RAYTHEON COMPANY, Waltham, MA (US)

(*) Notice: Subject to any disclaimer, the term of this patent is extended or adjusted under 35 U.S.C. 154(b) by 100 days.

(21) Appl. No.: 14/143,189

(22) Filed: Dec. 30, 2013

(65) Prior Publication Data

US 2015/0185369 A1     Jul. 2, 2015

(51) Int. Cl.
*G02B 3/00* (2006.01)
*G02B 27/42* (2006.01)
*G02B 3/04* (2006.01)
*G02B 5/18* (2006.01)
*G02B 3/02* (2006.01)
*G02B 25/00* (2006.01)

(52) U.S. Cl.
CPC .............. *G02B 3/0087* (2013.01); *G02B 3/04* (2013.01); *G02B 5/1814* (2013.01); *G02B 27/4211* (2013.01); *G02B 27/4216* (2013.01); *G02B 3/00* (2013.01); *G02B 3/02* (2013.01); *G02B 25/001* (2013.01); *G02B 2003/0093* (2013.01)

(58) Field of Classification Search
CPC ........ G02B 3/0087; G02B 3/02; G02B 3/00; G02B 3/04; G02B 27/4211; G02B 2003/0093; G11B 7/1365
USPC .......................... 359/652, 653, 654, 655, 558
See application file for complete search history.

(56) References Cited

U.S. PATENT DOCUMENTS 5,042,928 A     8/1991  Richards
5,568,574 A *  10/1996  Tanguay, Jr. ............. G02B 5/32
                                                          359/15
5,793,538 A     8/1998  Cameron et al.
6,108,135 A *   8/2000  Ho ........................ B82Y 10/00
                                                          359/654

(Continued)

FOREIGN PATENT DOCUMENTS

EP          0819952 A2     1/1998

OTHER PUBLICATIONS

Bowen et al., "Radial Gradient-Index Eyepiece Design," Applied Optics, vol. 27, No. 15, Aug. 1, 1988, pp. 3170-3176.

(Continued)

*Primary Examiner* — Bumsuk Won
*Assistant Examiner* — William R Alexander
(74) *Attorney, Agent, or Firm* — Lando & Anastasi, LLP

(57) ABSTRACT

In one embodiment, an optical imaging system is disclosed incorporating at least two gradient refractive index optical elements of a plurality of gradient refractive index optical elements made from at least one bulk material having a gradient refractive index and at least one diffractive optical element of a plurality of diffractive optical elements integrated within at least one of the plurality of gradient refractive index optical elements. Various embodiments disclosed incorporate at least one diffractive optical element configured as a surface relief structure patterned on at least one surface of the at least one gradient refractive index optical element. The surface relief structure includes at least one of a diffraction grating structure, a diffractive lens structure, and a kinoform structure. The at least one bulk material includes at least one of a radial gradient refractive index, an axial gradient refractive index, and a spherical gradient refractive index.

19 Claims, 14 Drawing Sheets

(56) References Cited

U.S. PATENT DOCUMENTS

| | | | |
|---|---|---|---|
| 6,166,862 A * | 12/2000 | Hashimura | G02B 27/0012 359/652 |
| 6,212,153 B1 | 4/2001 | Chen et al. | |
| 7,082,000 B2 | 7/2006 | Chen | |
| 7,391,580 B2 | 6/2008 | Maresse | |
| 7,564,633 B2 | 7/2009 | Webb | |
| 8,511,876 B2 | 8/2013 | DeWitt | |
| 2002/0038196 A1 * | 3/2002 | Johnson | G01N 21/4788 702/179 |
| 2004/0004751 A1 * | 1/2004 | Vilhelmsson | H01S 5/142 359/245 |
| 2006/0209292 A1 * | 9/2006 | Dowski et al. | 356/121 |
| 2008/0080060 A1 * | 4/2008 | Messerschmidt | 359/654 |
| 2010/0238400 A1 * | 9/2010 | Volk | G02C 7/061 351/159.42 |
| 2012/0155807 A1 * | 6/2012 | Knapp | G02B 6/32 385/61 |
| 2013/0188195 A1 * | 7/2013 | Messerschmidt | G02B 6/26 356/479 |

OTHER PUBLICATIONS

Information on Spherical GRIN, 2 pages, publicly available at least as early as Jul. 16, 2013.

McCarthy, Peter, "A Guide for Designing with Radial Gradient-Index Materials Constrained to Real Material Properties in Code V," University of Rochester, publicly available at least as early as Jul. 16, 2013, 9 pages.

University of Rochester Design Team, "Optical Design High Performance Eyepiece," publicly available at least as early as Jul. 16, 2013, 7 pages.

* cited by examiner

HYBRID GRIN DIFFRACTIVE OPTICS

BACKGROUND

Optical imaging systems have traditionally been created using either reflective or refractive optical elements. When refractive optical elements are used within imaging systems, these components often take the form of lenses with one or two curvature radii crafted within a homogeneous material. Use of refractive optical elements introduces various types of geometric and chromatic aberrations onto an optical image plane.

FIG. 1A depicts a lens 110 made of a homogeneous material as well as the spherical aberration 120 produced when imaging an object positioned at infinity. Similarly, FIG. 1B depicts a lens 130 made of a homogeneous material as well as the chromatic aberration 140 produced when imaging an object at positioned at infinity for various wavelengths. Overcoming these aberrations, as well as others such as coma, astigmatism, field curvature and distortion, to produce an image of desired quality often requires the introduction of numerous optical elements cascaded in series, with each element having its own unique geometric and optical properties that contribute to the characteristics of the desired output image. FIG. 2 depicts an example of a lithographic lens imaging system 200 where numerous discrete optical components have been introduced to meet a desired image quality. With each additional optical element added to an imaging system, additional size, weight, cost, and manufacturing complexity are imposed on the final end product.

In some cases, a reduction in the number or size of optical elements within an imaging system can be realized through the introduction of diffractive optical elements as either integrated features of existing refractive or reflective optical elements or completely separate optical elements. Diffractive optical elements can be used to provide functionality that is similar to certain types of refractive or reflective components, but within a smaller material volume.

Typical diffractive optical elements have their own sets of limitations that do not always replace the functionality provided by their refractive counterparts. While typical diffractive elements fashioned from homogeneous materials can be utilized for the correction of certain field aberrations, such as astigmatism, field curvature, and coma, they are less able to correct for chromatic aberrations due to the strong wavelength dispersion properties of most diffractive optical components. However, when combined with the dispersive properties of the substrate materials chromatic aberrations can be corrected.

SUMMARY OF INVENTION

Aspects and embodiments are directed to hybrid optical imaging systems comprised of gradient index (GRIN) optical material components with integrated or adjacent diffractive optical components that can be utilized for designing compact, lightweight optical imaging systems.

According to some embodiments, an optical imaging system comprises at least two gradient refractive index optical elements of a plurality of gradient refractive index optical elements made from at least one bulk material having a gradient refractive index, and at least one diffractive optical element of a plurality of diffractive optical elements integrated within at least one of the plurality of gradient refractive index optical elements. The at least one diffractive optical element is configured as a surface relief structure patterned on at least one surface of the at least one gradient refractive index optical element. In some embodiments, the at least one bulk material has a radial gradient refractive index distribution. In various embodiments, an axis of the radial gradient refractive index distribution coincides with a geometric axis of radial symmetry of the at least one gradient refractive index optical element. In other embodiments, the at least one bulk material includes at least one of an axial gradient refractive index distribution and a spherical gradient refractive index distribution. In some embodiments, the at least one optical element includes a pair of Wood lenses.

According to aspects of some embodiments, the surface relief structure includes at least one of a diffraction grating structure, a diffractive lens structure, and a kinoform structure. In some embodiments, the at least two gradient refractive index optical elements include a first cylindrical form factor gradient refractive index element with a first aspheric end surface and a first planar end surface, and a second cylindrical form factor gradient refractive index element optically coupled to the first cylindrical gradient index element and having a second planar end surface and a third planar end surface. The first cylindrical gradient refractive index element includes a first diffractive optical element of the plurality of diffractive optical elements patterned on the first aspheric surface and a second diffractive optical element of the plurality of diffractive optical elements patterned on the first planar end surface. In various embodiments, the bulk material of the first cylindrical form factor gradient refractive index element includes at least one of a radial gradient refractive index distribution, an axial gradient refractive index distribution, and a spherical gradient refractive index distribution. In some embodiments, the bulk material of the second cylindrical form factor gradient refractive index element includes at least one of a radial gradient refractive index distribution, an axial gradient refractive index distribution, and a spherical gradient refractive index distribution.

According to aspects of some embodiments, the optical imaging system further comprises a plano-convex optical element having a first aspheric end surface and a first planar surface. The at least two gradient refractive index optical elements of the optical imaging system include a first cylindrical form factor gradient index optical element having a second planar end surface and a third planar end surface, wherein the second planar end surface is optically coupled to the first planar end surface of the plano-convex optical element and a second cylindrical form factor gradient index optical element having a fourth planar end surface and a fifth planar end surface, wherein the fourth planar end surface is optically coupled to the third planar end surface of the first cylindrical form factor gradient index optical element. In some embodiments, the first cylindrical gradient index optical element further comprises a first diffractive optical element of the plurality of diffractive optical elements patterned on the second planar end surface and a second diffractive optical element of the plurality of diffractive optical elements patterned on the third planar end surface. In various embodiments, the first planar end surface of the plano-convex optical element is in physical contact with the second planar end surface of the first cylindrical gradient index optical element. In other embodiments, the first planar end surface of the plano convex optical element is physically separated from the first cylindrical gradient index optical element.

In some embodiments, the at least two gradient refractive index optical elements include a first cylindrical form factor gradient refractive index element with a first spherical end surface and a first planar end surface and a second cylindrical form factor gradient refractive index element optically coupled to the first cylindrical form factor gradient index element and having a second planar end surface and a first aspherical end surface. The first cylindrical form factor gradient refractive index element includes a first diffractive optical element of the plurality of diffractive optical elements patterned on the first planar end surface. The second cylindrical form factor gradient refractive index element includes a second diffractive optical element of the plurality of diffractive optical elements patterned on the second planar end surface. In some embodiments, the bulk material of the first cylindrical form factor gradient refractive index element includes at least one of a radial gradient refractive index distribution, an axial gradient refractive index distribution, and a spherical gradient refractive index distribution. In various embodiments, the bulk material of the second cylindrical form factor gradient refractive index element includes at least one of a radial gradient refractive index distribution, an axial gradient refractive index distribution, and a spherical gradient refractive index distribution.

According to some embodiments, an optical imaging system comprises at least one optical element fashioned from a bulk material having a gradient refractive index and at least one diffractive optical element incorporating a surface relief structure on at least one surface. In some embodiments, the at least one optical element fashioned from a bulk material having a gradient refractive index has a radial gradient refractive index distribution. In various embodiments, the at least one optical element fashioned from a bulk material having a radial gradient refractive index distribution is of right cylindrical shape. The axis of the radial distribution for the at least one optical element fashioned from a bulk material having a radial gradient refractive index distribution material coincides with the physical axis of the element's right cylindrical shape. In some embodiments, the at least one optical element fashioned from a bulk material having a gradient index material has an axial gradient refractive index distribution. In other embodiments, the at least one optical element fashioned from a bulk material having a gradient index material has a spherical gradient refractive index distribution. In various embodiments, the surface relief structure is a diffraction grating structure. In other embodiments, the surface relief structure is a diffractive lens structure. In further embodiments, the surface relief structure is a diffractive corrector structure.

According to aspects of some embodiments, an optical imaging system comprises at least one optical element fashioned from a bulk material having a gradient refractive index, and at least one diffractive optical element, where the diffractive optical element is integrated into the same bulk material having a gradient refractive index forming at least one integrated gradient index diffractive optical element. In some embodiments, the surface relief structure is a diffraction grating structure. In various embodiments, the surface relief structure is a diffractive lens structure. In some embodiments, the surface relief structure is a diffractive corrector structure. In particular embodiments, the at least one optical element fashioned from a bulk material having a gradient refractive index has a radial gradient refractive index distribution. The at least one optical element fashioned from a bulk material having a radial gradient refractive index distribution is of right cylindrical shape. In some embodiments, the axis of the radial distribution for the at least one optical element fashioned from a bulk material having a radial gradient refractive index distribution material coincides with the physical axis of the element's right cylindrical shape. In various embodiments, the at least one optical element fashioned from a bulk material having a gradient index material has an axial gradient refractive index distribution. In other embodiments, the at least one optical element fashioned from a bulk material having a gradient index material has a spherical gradient refractive index distribution.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Gradient index (GRIN) optical components are fashioned from bulk materials that have a smooth and controlled variation of refractive index over distance within the material. When tracing the path of an optical ray traveling through a GRIN material, the path of that optical ray is bent most strongly when the ray is perpendicular to an optical index gradient, and is not bent when traveling a path parallel to an index gradient. The refractive index profile of GRIN materials can be designed to vary in one, two or three separate dimensions. Three categories of GRIN materials of particular note include axial GRIN materials, spherical GRIN materials, and radial GRIN materials.

Figure 1A:
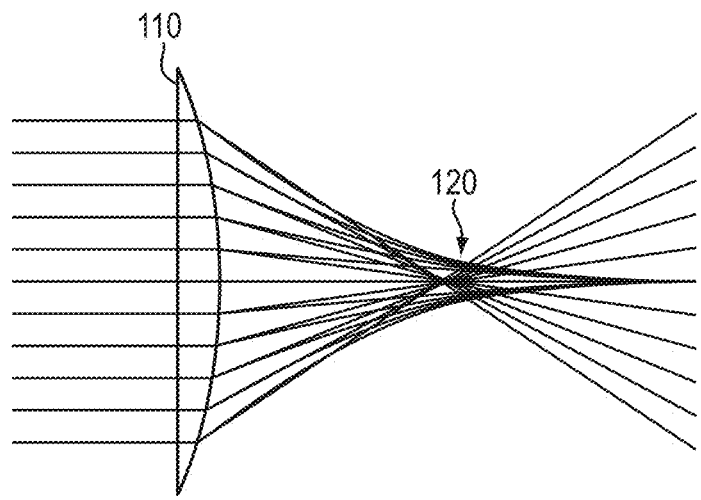
FIG. 1A is a diagram illustrating spherical aberration in imaging a single wavelength produced by a curved lens constructed from a homogeneous material.
Figure 1B:
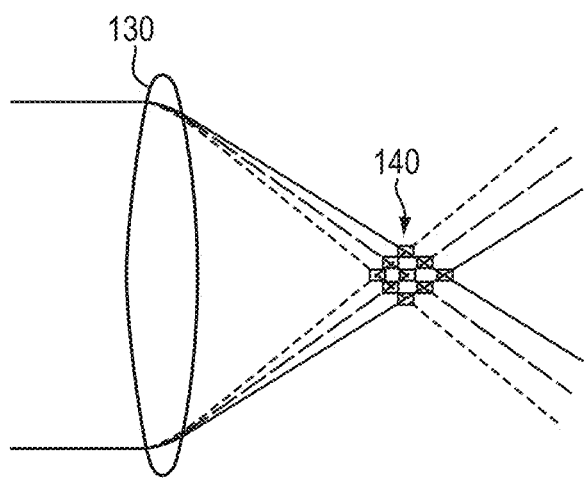
FIG. 1B is a diagram illustrating chromatic aberration in imaging multiple wavelengths produced by a curved lens constructed from a homogeneous material.
Figure 2:
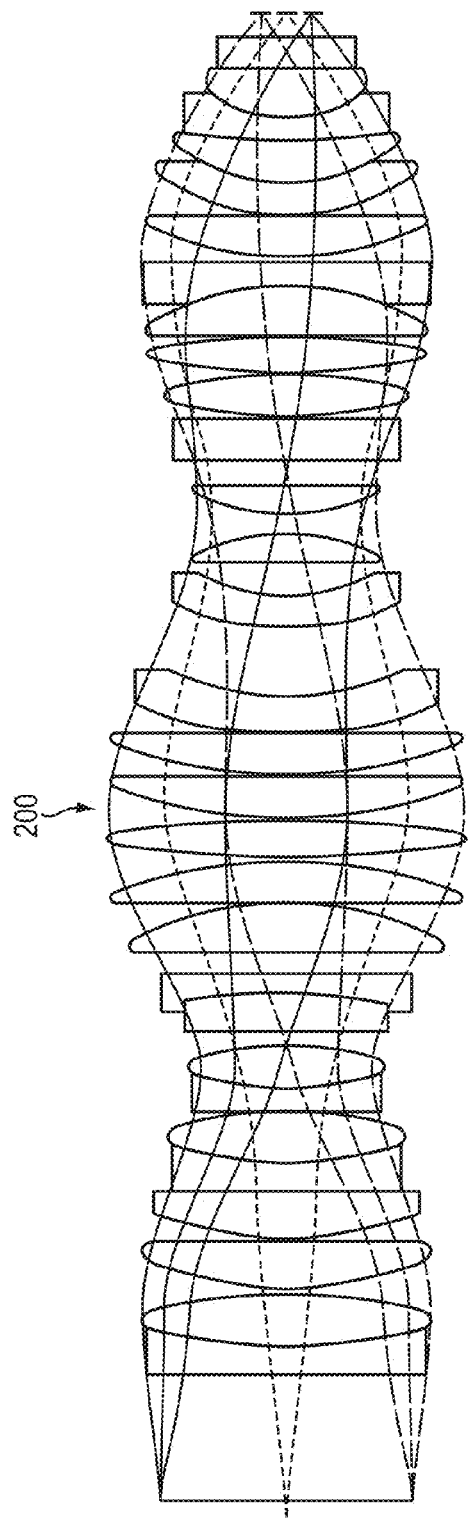
FIG. 2 is a diagram of a conventional lithographic lens imaging system comprised of multiple discrete optical elements constructed from homogeneous materials.
Figure 3A:
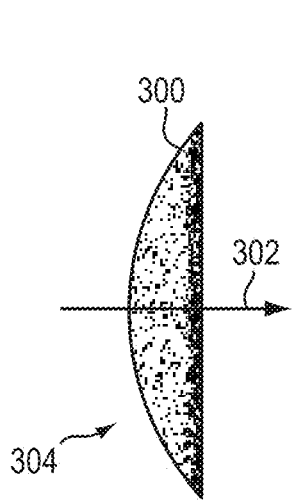
FIG. 3A is a diagram of an axial GRIN material showing the axis of the graded index coinciding with the optical axis of the system.
Figure 3B:
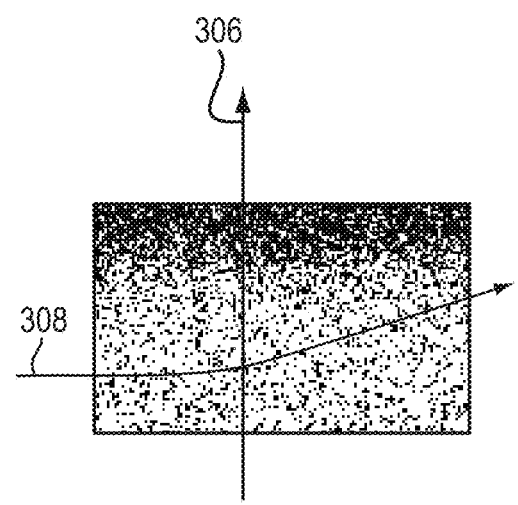
FIG. 3B is a diagram of an axial GRIN material showing the axis of the graded index perpendicular to the optical axis of the system and the bending of a ray propagating through the GRIN material.

As depicted in FIG. 3A, axial GRIN materials 300 have variation of refractive index in only a single dimension, along the optical axis. As stated above, when the index variation 302 of an axial GRIN material is parallel to the light's direction of propagation, the axial GRIN material provides no refractive power. Any refractive power from an aligned axial GRIN optical element must come from curvature 304 of the element's surface, much like a traditional lens. In this configuration, the index variation of the GRIN material can be designed to provide for correction of spherical aberration introduced by the curvature of the element's surface. As depicted in FIG. 3B, when the direction of index variation 306 is initially perpendicular to the direction of light propagation 308, or if at least a component of the light's wave vector is perpendicular to the direction of index variation, then the axial GRIN material will impose a refractive power on the light wave, bending the direction of light propagation.

Figure 3C:
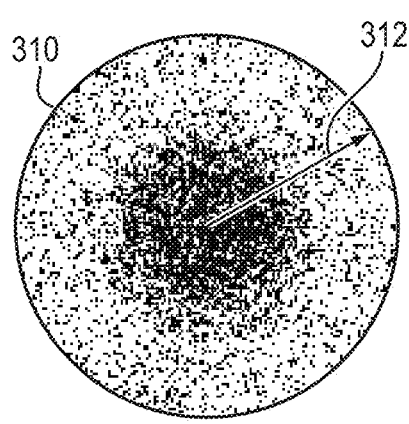
FIG. 3C is a diagram of a spherical GRIN material.

As shown in FIG. 3C, a spherical GRIN material 310 has variation of refractive index as a function of distance 312 from a single point in three dimensions, resulting in concentric spherical shells of constant refractive index. Examples of optical elements incorporating spherical GRIN materials include the Luneburg lens, in which any point of the spherical lens surface is a focal point for an object located at infinity whose light is incident on the opposite side of the sphere, and Maxwell's fish-eye lens, in which any point on the spherical lens surface is a focal point for an image of the point on the direct opposite side of the sphere.

Figure 3D:
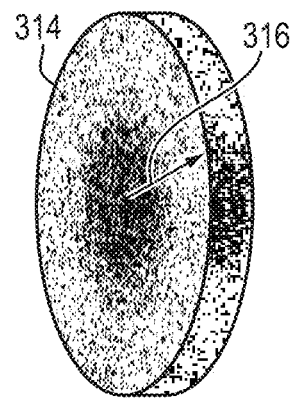
FIG. 3D is a diagram of a radial GRIN material.
Figure 4:
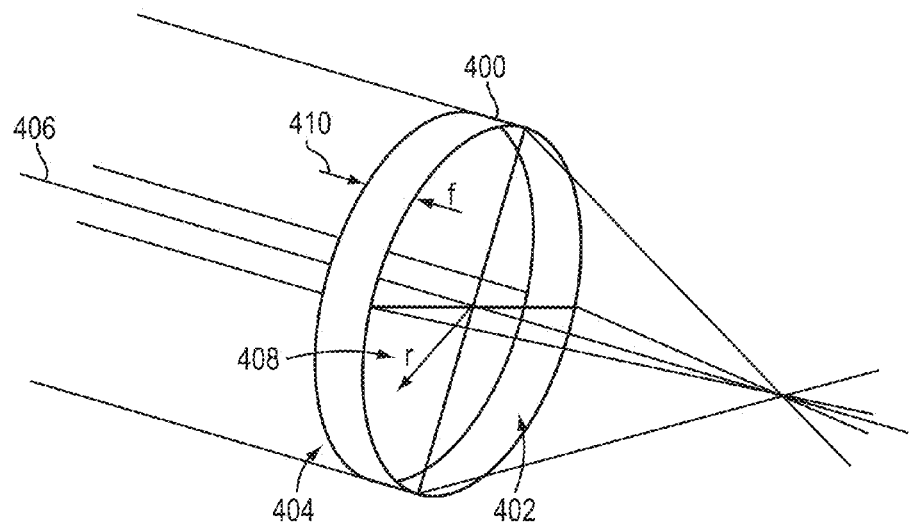
FIG. 4 is a diagram of a radial GRIN material structured as a Wood lens.

As shown in FIG. 3D, a radial GRIN material 314 has variation of refractive index 316 as a function of distance from a central axis, resulting in concentric cylinders of constant refractive index. As depicted in FIG. 4, when a radial GRIN optical element 400 is constructed as a right cylinder having two flat surfaces 402 and 404 and a refractive index distribution axis 406 that coincides with the right cylinder's geometric axis of symmetry which is also directed along line 406, the radial GRIN element acts as a lens with refractive optical power. Such a device is known as a Wood lens. Through appropriate design of the refractive index distribution 408 of a radial GRIN material and device thickness 410, the amount of various types of spatial aberration can be introduced with relatively minimal amounts of chromatic aberration.

Diffractive optical elements are optical components that perform wave front transformation via diffraction, and may encompass components such as diffraction gratings, which have a periodic variation of refractive index, as well as diffractive lenses and correctors, which have a more general alternation of spatial refractive index profile. Diffractive optical elements can be either surface relief structures, such as kinoform structures, where a geometric pattern is etched into the surface of an optical component, or holographic structures, where the variation of refractive index occurs within the material itself. The distinction between gradient index materials and holographic diffractive optical elements is mainly in the nature of the refractive index profile defined within the structure. These differences include the absence or presence of periodicity in the refractive index profile as well as the presence or absence of monotonic variation in refractive index profile. GRIN materials generally have well-defined monotonic variation of refractive index in one, two, or three dimensions, whereas the variation of refractive index in a holographic diffractive element may be described by more complex and non-monotonic variation of refractive index distribution.

Aspects and embodiments are directed to constructing optical imaging systems including the integration of GRIN optical elements with diffractive optical elements, which provides for additional degrees of design freedom within individual optical components as compared to systems constructed of homogeneous materials and simple radial curved surfaces. By introducing these additional degrees of freedom for the spatial refractive index profile both within the optical material and on the surface of the optical elements, the number of components necessary to correct for various spatial and chromatic aberrations can be reduced. Consequently, the weight, volume, size, manufacturing complexity, and overall cost of constructing imaging systems can all be reduced while maintaining or improving desired image quality.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. For example, while many of the aspects and embodiments of the methods and apparatuses discussed herein are described with regard to the optical portion of the electromagnetic spectrum, various embodiments could also be implemented for operation in other spectral bands including microwave, infrared, long wave infrared, ultraviolet, and other spectral bands. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 5:
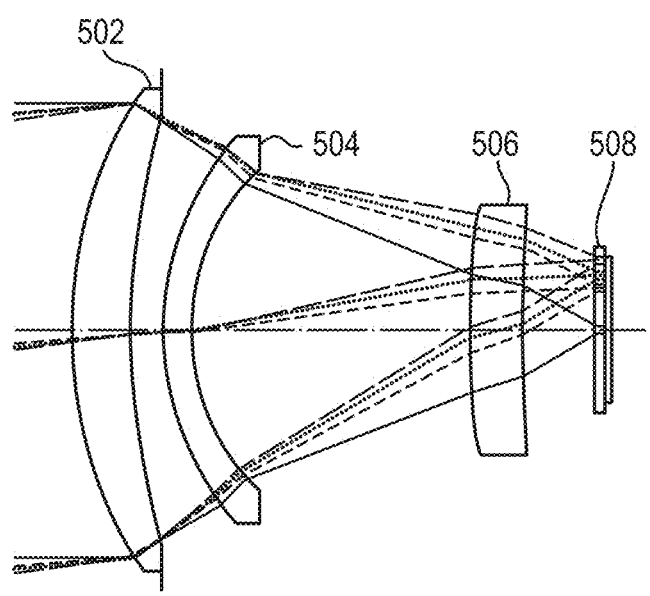
FIG. 5 is a diagram of a typical optical imaging system composed of only refractive optical elements.

Referring to FIG. 5, there is illustrated an example of a conventional optical imaging system 500 including a set of refractive lenses constructed of homogeneous materials. Lenses 502 and 504 form the primary objective lenses of the system, where lens 504 is designed to provide axial color correction for chromatic aberration introduced by lens 502. Lens 506 acts as a field lens focusing optical radiation on image plane 508. All lenses in the depicted optical imaging system 500 have only refractive power garnered from surface curvature.

Figure 6:
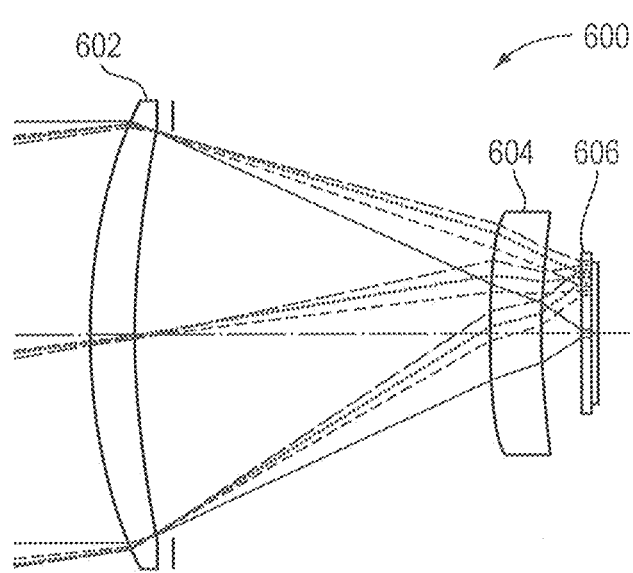
FIG. 6 is a diagram of an example of an optical imaging system in which the primary objective lens is a hybrid refractive/diffractive optical element.

FIG. 6 illustrates an example of similar optical imaging system 600 where lens 602 replaces lenses 502 and 504 from FIG. 5. Lens 602 is a refractive lens on which a surface relief diffractive texturing has been patterned. The integration of the diffractive characteristics of the surface relief structure with the refractive power of the bulk lens provides for the color correction characteristics of lens 504 to be incorporated into a single objective lens 602. Lens 604 acts as a field lens similar to lens 506 imaging on to an image plane 606.

Figure 7:
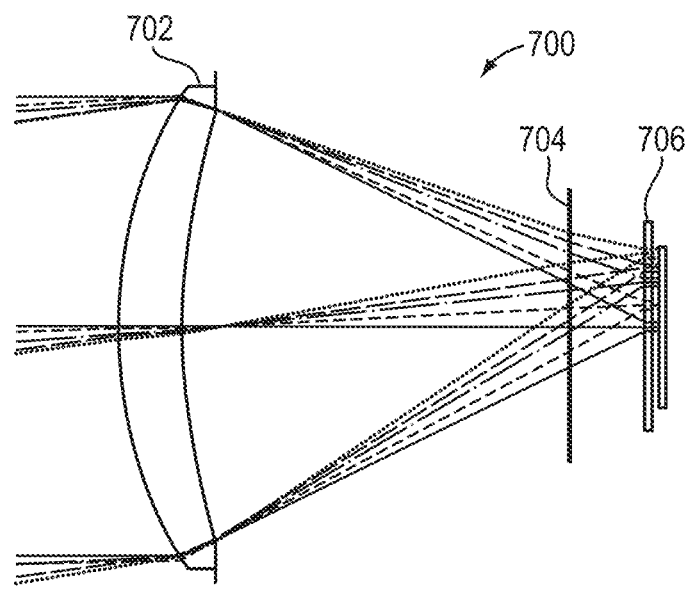
FIG. 7 is a diagram of an optical imaging system in which the primary objective lens is a hybrid refractive/diffractive optical element and the field lens is a diffractive optical element.

FIG. 7 illustrates an example of similar optical imaging system 700, in which the refractive field lens 506 from FIG. 5 and field lens 604 from FIG. 6 have been replaced by a diffractive optical element 704. Diffractive element 704 provides for correction of spatial field aberrations such as astigmatism, field curvature, and coma, but does not provide for correction of chromatic aberrations. Much like the primary objective lens 602 from FIG. 6, primary objective lens 702 provides both refractive power due to surface curvature and diffractive power from the patterning of a surface relief grating structure. The system 700 produces an image on image plane 706.

Figure 8:
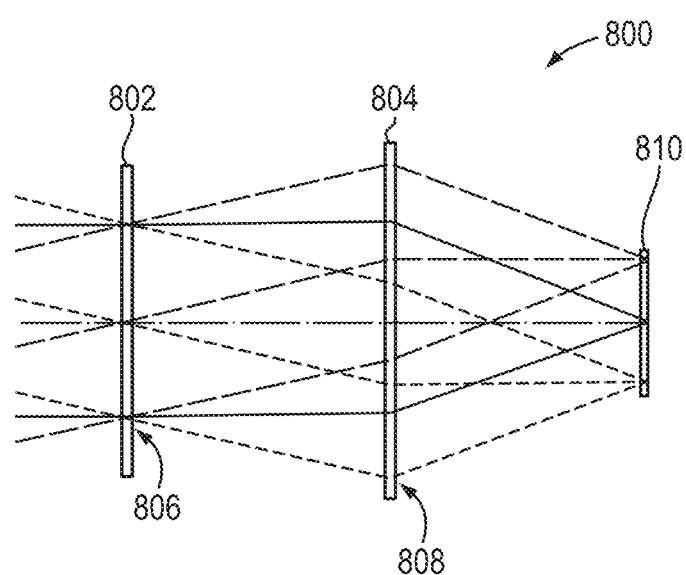
FIG. 8 is a diagram of an optical imaging system in which both the primary objective lens and the field lens are hybrid GRIN-diffractive optical elements.

Referring to FIG. 8, there is illustrated an example of an optical imaging system 800 according to another embodiment, in which both the objective lenses and the field lenses from FIG. 5, FIG. 6, and FIG. 7 have been replaced with hybrid GRIN-diffractive optical elements, according to aspects of the present invention. In the illustrated example, the hybrid GRIN-diffractive optical elements are comprised of two Wood lens-type cylindrical GRIN structures 802 and 804 with patterned surface relief gratings 806 and 808 into at least one of the flat surfaces of each element. The imaging system 800 images on to image plane 810. In one example the surface relief gratings 806 and 808 are etched into the surface; however, in other examples other manufacturing techniques, such as diamond turning, photolithography or electron-beam lithography, can be used to impart a designed pattern onto the surface(s). The integrated GRIN-Diffractive element provides refractive power and diffractive power for the correction of both spatial field aberrations and chromatic aberrations in element that do not incorporate traditional refractive power from the incorporation of curved surfaces.

In some configurations, such as the configuration depicted in FIG. 8, the diffractive structure may be implemented as a surface relief profile on one or more surfaces of the GRIN optical element. In other configurations, such as the configuration shown in FIG. 9, a hybrid GRIN-diffractive element 900 may be implemented as a diffractive structure 902 patterned as a surface relief structure in a homogeneous material 904 positioned adjacent to a GRIN material 906. In such a hybrid optical element, the diffractive power of element 902 is primarily designed to correct for spatial field aberrations, while the GRIN element 906 is primarily designed to correct for chromatic aberrations. In various embodiments, the GRIN element could have a radial, axial, or spherical refractive index distribution.

Figure 9:
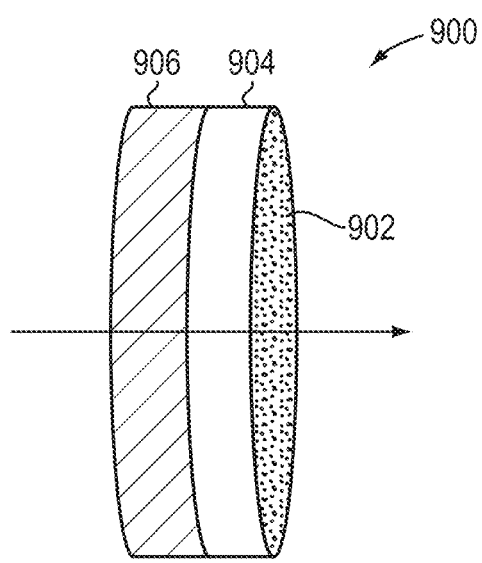
FIG. 9 is a diagram of a hybrid GRIN-diffractive optical element comprised of a GRIN element adjacent to a surface relief structure diffractive optical element.
Figure 10:
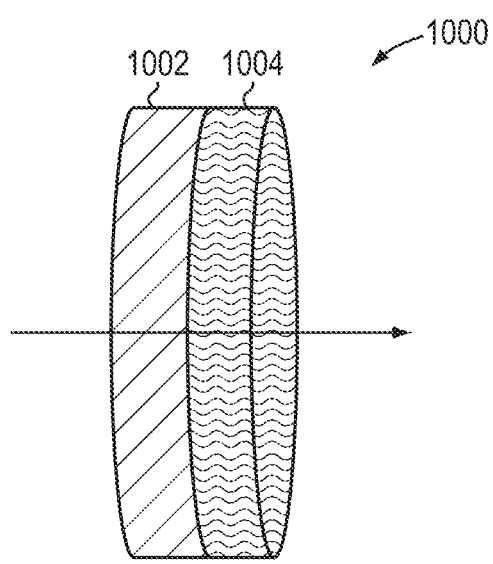
FIG. 10 is a diagram of a hybrid GRIN-diffractive optical element comprised of a GRIN element adjacent to a holographic diffractive optical element.

A variation of the hybrid GRIN-diffractive optical element presented in FIG. 9 is depicted in FIG. 10. In this configuration, the hybrid GRIN-diffractive element 1000 is implemented such that the diffractive optical element is a holographic grating structure. In this design, a Wood lens type radial GRIN structure 1002 is placed adjacent to a holographic grating structure 1004, where both optical elements have substantially completely flat surfaces (within reasonable manufacturing tolerances). In various embodiments, the GRIN structure 1002 could also be an axial or spherical GRIN structure.

According to other embodiments, in some variations, a series of GRIN elements having axial, radial, or spherical index variation can be cascaded within an optical imaging train along with discrete diffractive optical components. In other variations, a series of GRIN elements having integrated surface relief grating structures on one or more surfaces can be cascaded within an optical imaging train.

Figure 11:
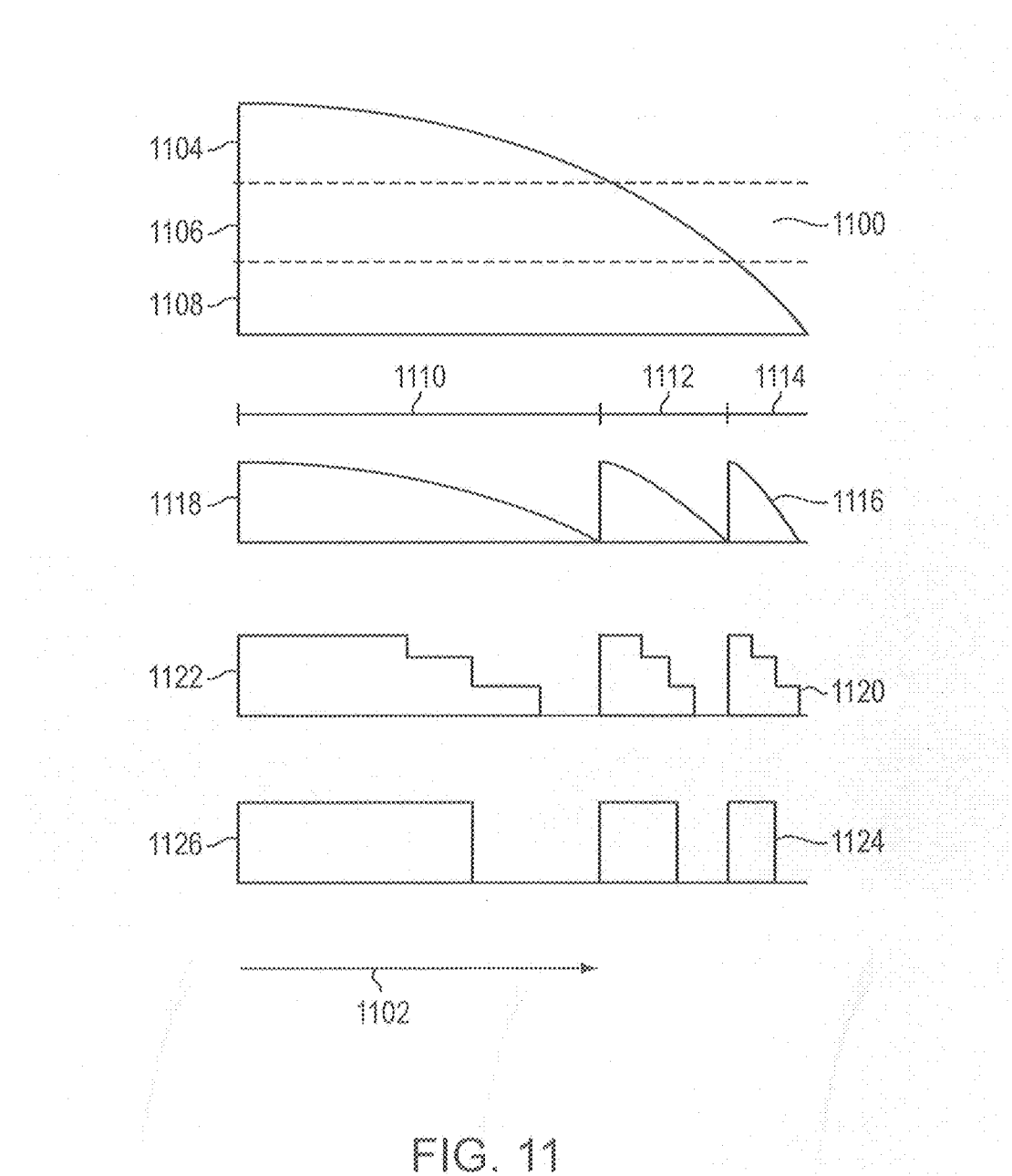
FIG. 11 is a diagram of the phase profiles associated with a refractive surface, a kinoform diffractive surface, a multilevel binary grating surface, and a single level binary grating surface.

FIG. 11 depicts various examples of how a general phase profile 1100 that might normally be introduced by a purely refractive and homogeneous optical element can be replicated through the use of kinoform, diffractive structures, and binary diffractive structures, such as structures 1116, 1120, and 1124. When designing surface relief diffractive structures that replicate a phase profile, such as profile 1100, imparted by a refractive structure with a smoothly varying surface over a radial distance 1102, the phase profile can first be partitioned into segments that each introduces a $2\pi$ radians phase shift on an incident optical wave, such as segments 1104, 1106, and 1108. Each of these segments corresponds to separate radial regions, 1110, 1112, and 1114. In a kinoform surface relief structure having a quadratic phase profile, such as structure 1116, the phase variations within segments 1104, 1106, and 1108 are all collapsed into a single layer 1118. The diffraction efficiency of a kinoform surface relief structure having a quadratic phase profile, such as structure 1116 can often match 100% of the efficiency for the imparted phase profile of the original refractive structure. The general phase profile 1100 can also be approximated by a multilevel binary surface relief structure, such as profile 1120 within a layer of $2\pi$ radians phase shift 1122. A four-level binary profile, such as profile 1120, can often match approximately 81% of the efficiency for the imparted phase profile of the original refractive structure. A two-level binary profile, such as profile 1124 within layer 1126, can often match approximately 40% of the efficiency of the original refractive structure.

Figure 12:
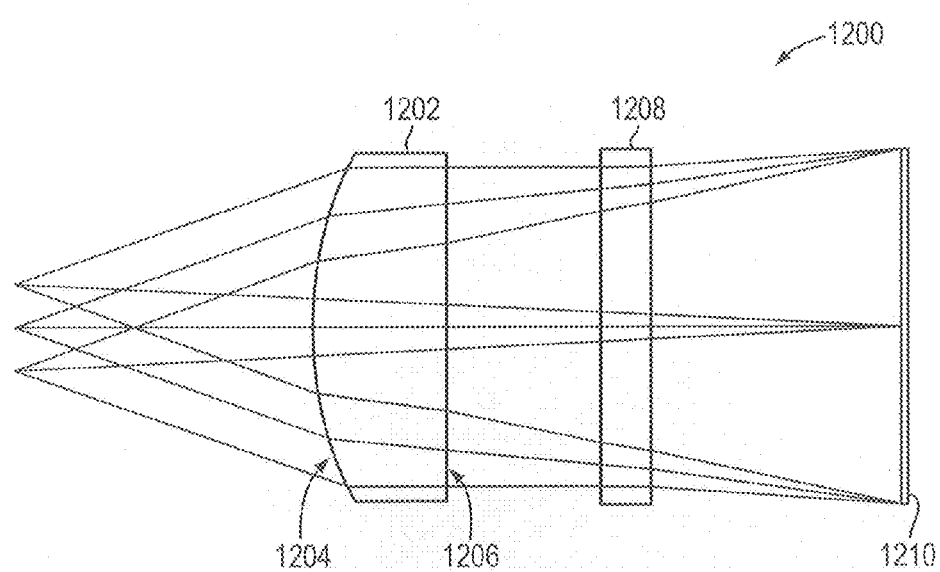
FIG. 12 is a diagram of a hybrid GRIN-diffractive imaging system including two cylindrical form factor radial gradient index optical elements with one element incorporating an aspheric surface and dual diffractive surfaces.

FIG. 12 depicts an example hybrid GRIN-diffractive eyepiece imaging system 1200 that includes two separate GRIN structures cascaded in series. The first GRIN element 1202 is a plano-convex element composed of a radial GRIN material whose central axis of radial refractive index distribution is parallel to the optical axis of the imaging system. GRIN element 1202 includes an aspheric concave refractive surface 1204 and a planar surface 1206. Both the aspheric concave refractive surface 1204 and planar surface 1206 incorporate kinoform diffractive surface relief structures, such as the kinoform structures shown in structure 1116. These kinoform diffractive relief structures alter the phase of optical energy that passes through each of the surfaces. In various embodiments, the integrated diffractive structures can be multilayer or single-layer binary surface relief structures, such as structures 1120 and 1124. The example hybrid GRIN-diffractive eyepiece also includes a second Woodlens type radial GRIN element 1208 that acts as a field lens for focusing optical energy at an image plane 1210.

Table 1 provides an optical prescription for an example eyepiece optical system 1200 corresponding to the ray trace illustrated in FIG. 12. The optical prescription for this example optical system 1200 can be generated using sets of equations that are industry standard and which would be known to those skilled in the art. It is to be appreciated however, that the prescription given in Table 1 is merely exemplary, and that the prescriptions of various embodiments of the optical system 1200 are determined by the intended imaging task to be performed by the optical system.

The example eyepiece corresponding to Table 1 was designed over the photopic waveband.

Effective focal length of the example system is 34 mm;
Back focal length of the example system is 17.71 mm;
Equation for optical surfaces:

$$SAG = \frac{CC*Y*Y}{1+SQRT(1-(1+K)*CC*CC*Y*Y)} + A*Y**4 + B*Y**6 + C*Y**8 + D*Y**10 + \left\{ \frac{C1*Y**2 + C2*Y**4 + C3*Y**6}{(N1-N2)} - \frac{LAMBDA}{(N1-N2)} * INT\left\{ \frac{C1*Y**2 + C2*Y**4 + C3*Y**6}{LAMBDA} \right\} \right\} * HOR$$

HOR is the diffraction design order.
LAMBDA is the diffractive surface design wavelength.
Y is the radius of the surface.
K is the conic constant used in the description of an aspheric surface profile;
A, B, C, and D are the $4^{th}$ order, $6^{th}$ order, $8^{th}$ order, and $10^{th}$ order aspheric constants used in the description of an aspheric surface profile;
C1 and C2 are the $2^{nd}$ order and $4^{th}$ order coefficients of the phase function imposed on a wave passing through a diffractive surface described by $p(r)=C_1*Y^2+C_2*Y^4$;
N00 is the base refractive index of a region;
N10, N20, N30 are the $2^{nd}$ order, $4^{th}$ order, and $6^{th}$ order coefficients of the radial gradient refractive index distribution function $n(r)=N_{00}+N_{10}*Y^2+N_{20}*Y^4+N_{30}*Y^6$.

TABLE 1

| Surface No. | Function | Radius (mm) | K | A | B | C |
|---|---|---|---|---|---|---|
| 1 | Front Objective Lens Diffractive | 18.122 | 0 | −4.113e−05 | −8.138e−08 | 1.683e−10 |
| 2 | Back Objective Lens Diffractive | Infinity | N/A | N/A | N/A | N/A |
| 3 | Front Field Lens | Infinity | N/A | N/A | N/A | N/A |
| 4 | Back Field Lens | Infinity | N/A | N/A | N/A | N/A |
| 5 | Image Plane | Infinity | N/A | N/A | N/A | N/A |

| Surface No. | D | Grating Type | Diffraction Order | C1 | C2 | Distance to next surface (mm) |
|---|---|---|---|---|---|---|
| 1 | 2.065e−13 | Kinoform | −1 | −7.345e−05 | 1.535e−05 | 9.00 |
| 2 | N/A | Kinoform | −1 | 1.963e−03 | −1.793e−05 | 9.959 |
| 3 | N/A | N/A | N/A | N/A | N/A | 3.00 |
| 4 | N/A | N/A | N/A | N/A | N/A | 17.67 |
| 5 | N/A | N/A | N/A | N/A | N/A | N/A |

| Surface No. | N00 | N10 | N20 | N30 |
|---|---|---|---|---|
| 1 | 1.4988 | 1.808e−04 | −1.202e−05 | −0.9926e−08 |
| 2 | 1 | N/A | N/A | N/A |
| 3 | 1.5949 | −9.194e−04 | −8.777e−06 | 1.121e−08 |
| 4 | 1 | N/A | N/A | N/A |
| 5 | N/A | N/A | N/A | N/A |

Figure 13:
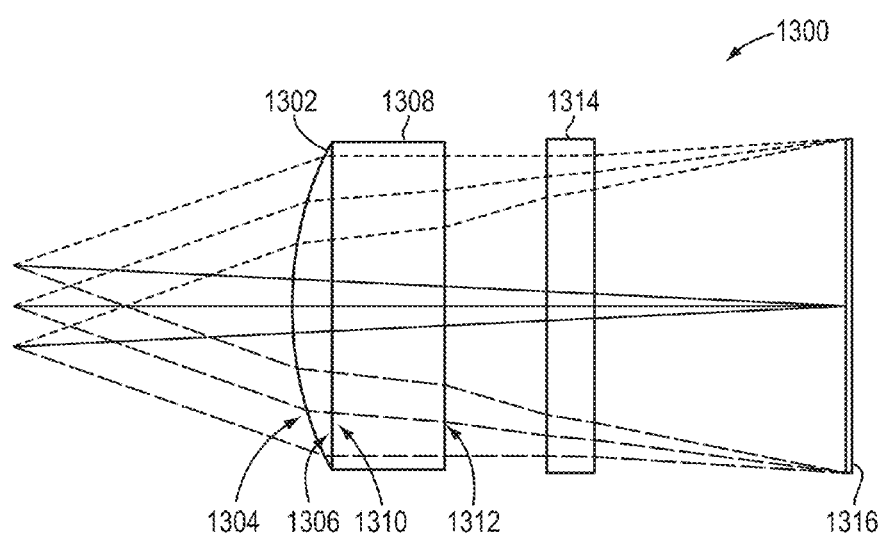
FIG. 13 is a diagram of a hybrid GRIN-diffractive imaging system including two cylindrical form factor radial gradient index optical elements with planar end surfaces and one homogeneous index optical element having one planar surface and one aspheric surface.

Entrance pupil location for the ray trace in the displayed system in FIG. 12 is located 20 mm to the left of the first surface;

Entrance pupil diameter for the example system in the ray trace in FIG. 12 is shown at 5 mm;

FIG. 13 depicts another example hybrid GRIN-diffractive eyepiece imaging system 1300 that also includes two separate GRIN structures cascaded in series, but also includes a separate homogeneous plano-convex element. The plano-convex element 1302 includes an aspheric refractive surface 1304 and a planar surface 1306. The plano-convex element 1302 is adjacent to, but slightly separated from, a first Wood-lens type radial GRIN element 1308. Diffractive surface relief structures are incorporated into the front surface 1310 and back surface 1312 of the first radial GRIN element 1308, and can be kinoform or binary surface relief structures similar to those discussed previously above. A second Wood-lens type radial GRIN element 1314 acts as a field lens focusing optical energy at an image plane 1316.

Figure 14A:
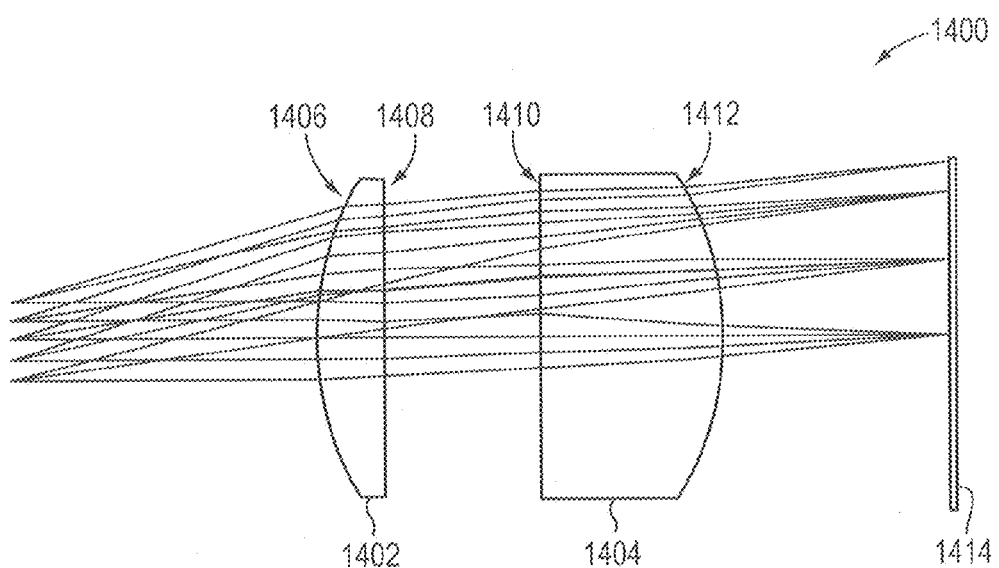
FIG. 14A is a diagram of a hybrid GRIN-diffractive imaging system including two cylindrical form factor spherical gradient index optical elements with one element incorporating one spherical surface and one flat diffractive surface and a second element incorporating a flat surface and a aspheric surface.
Figure 14B:
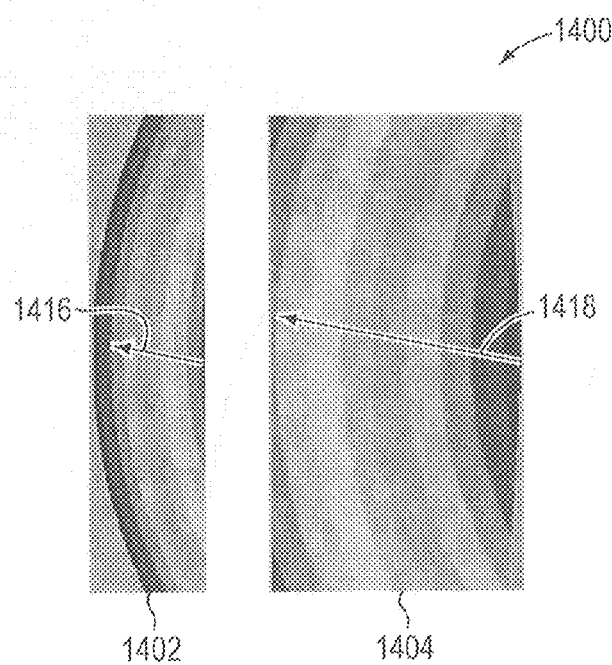
FIG. 14B is a diagram of the spherical gradient refractive index distributions for the two optical elements in FIG. 14A.

In variations of the example imaging systems presented in FIG. 12 and FIG. 13, the radial GRIN elements could be replaced, either individually or in tandem, with spherical GRIN or axial GRIN elements. FIG. 14A shows one example of an all-spherical gradient index hybrid GRIN-diffractive eyepiece imaging system 1400. The system 1400 includes two plano-convex elements 1402 and 1404. The first plano-convex element 1402 includes a front spherical refractive surface 1406 and a back planar surface 1408 incorporating a diffractive surface relief structure. The second plano-convex element 1404 includes a front planar surface 1410 optically coupled to surface 1408 and a back aspheric surface 1412. FIG. 14B shows an example of the spherical gradient refractive index distributions 1416 and 1418 associated with elements 1402 and 1404 respectively. In some embodiments, a diffractive surface relief structure may also be integrated into the second plano-convex element 1404 on the front planar surface 1410 or the back aspheric surface 1412. In other embodiments diffractive surface relief structures may be integrated onto both the front planar surface 1410 and the back aspheric surface 1412.

In some embodiments of the hybrid GRIN-diffractive imaging systems 1200, 1300, and 1400, the GRIN elements can be constructed from plastic materials having spatially varying refractive index distributions. In various embodiments, the plano-convex element 1302 can be constructed from a glass material. In various embodiments, the system can be operational over different wavelength bands, where the possible wavelength bands of operation can comprise long wave infrared (LWIR), near infrared (NIR), mid-wave infrared (MWIR), and short wave infrared (SWIR), in addition to the optical wavelength bands. While the design of the imaging system 1300 could potentially incorporate the two diffractive surfaces on any of the six surfaces of elements 1302, 1308, and 1314, by incorporating the diffractive surfaces on only the two surfaces of the first radial GRIN element 1308, the process for manufacturing the entire system can be simplified.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical imaging system comprising:
   at least two gradient refractive index optical elements of a plurality of gradient refractive index optical elements made from at least one bulk material having a gradient refractive index;
   a first diffractive surface relief structure patterned on a first surface of a first gradient refractive index optical element of the at least two gradient refractive index optical elements; and
   a second diffractive surface relief structure patterned on a second surface of the first gradient refractive index optical element of the at least two gradient refractive index optical elements, the first and the second diffractive surface relief structures configured to alter the phase of optical energy that passes through the first gradient refractive index optical element of the at least two gradient refractive index optical elements.

2. The optical imaging system of claim 1, wherein the at least one bulk material has a radial gradient refractive index distribution.

3. The optical imaging system of claim 2, wherein an axis of the radial gradient refractive index distribution coincides with a geometric axis of radial symmetry of the first gradient refractive index optical element.

4. The optical imaging system of claim 1, wherein the at least one bulk material includes at least one of an axial gradient refractive index distribution and a spherical gradient refractive index distribution.

5. The optical imaging system of claim 1, wherein each of the first and the second diffractive surface relief structures includes at least one of a diffraction grating structure, a diffractive lens structure, and a kinoform structure.

6. The optical imaging system of claim 1, wherein the at least two gradient refractive index optical elements include:
   a first cylindrical form factor gradient refractive index element with a first aspheric end surface and a first planar end surface; and
   a second cylindrical form factor gradient refractive index element optically coupled to the first cylindrical gradient index element and having a second planar end surface and a third planar end surface.

7. The optical imaging system of claim 6, wherein the first cylindrical gradient refractive index element includes:
   the first diffractive surface relief structure patterned on the first aspheric surface; and
   the second diffractive surface relief structure patterned on the first planar end surface.

8. The optical imaging system of claim 6, wherein the bulk material of the first cylindrical form factor gradient refractive index element includes at least one of a radial gradient refractive index distribution, an axial gradient refractive index distribution, and a spherical gradient refractive index distribution.

9. The optical imaging system of claim 6, wherein the bulk material of the second cylindrical form factor gradient refractive index element includes at least one of a radial gradient refractive index distribution, an axial gradient refractive index distribution, and a spherical gradient refractive index distribution.

10. The optical imaging system of claim 1, further comprising a plano-convex optical element having a first aspheric end surface and a first planar end surface.

11. The optical imaging system of claim 10, wherein the at least two gradient refractive index optical elements include:
   a first cylindrical form factor gradient index optical element having a second planar end surface and a third planar end surface, wherein the second planar end surface is optically coupled to the first planar end surface of the plano-convex optical element; and
   a second cylindrical form factor gradient index optical element having a fourth planar end surface and a fifth planar end surface, wherein the fourth planar end surface is optically coupled to the third planar end surface of the first cylindrical form factor gradient index optical element.

12. The optical imaging system of claim 11, wherein the first cylindrical gradient index optical element further comprises:
   the first diffractive surface relief structure patterned on the second planar end surface; and
   the second diffractive surface relief structure patterned on the third planar end surface.

13. The optical imaging system of claim 12, wherein the first planar end surface of the plano-convex optical element is in physical contact with the second planar end surface of the first cylindrical gradient index optical element.

14. The optical imaging system of claim 12, wherein the first planar end surface of the plano convex optical element is physically separated from the first cylindrical gradient index optical element.

15. The optical imaging system of claim 1, wherein the at least two gradient refractive index optical elements include:
   a first cylindrical form factor gradient refractive index element with a first spherical end surface and a first planar end surface; and
   a second cylindrical form factor gradient refractive index element optically coupled to the first cylindrical form factor gradient index element and having a second planar end surface and a first aspherical end surface.

16. The optical imaging system of claim 15, wherein the second cylindrical form factor gradient refractive index element includes the first diffractive surface relief structure patterned on the second planar end surface and the second diffractive surface relief structure patterned on the first aspherical end surface.

17. The optical imaging system of claim 16, wherein the first cylindrical form factor gradient refractive index element includes a third diffractive surface relief structure patterned on the first planar end surface.

18. The optical imaging system of claim 15, wherein the bulk material of the first cylindrical form factor gradient refractive index element includes at least one of a radial gradient refractive index distribution, an axial gradient refractive index distribution, and a spherical gradient refractive index distribution.

19. The optical imaging system of claim 15, wherein the bulk material of the second cylindrical form factor gradient refractive index element includes at least one of a radial gradient refractive index distribution, an axial gradient refractive index distribution, and a spherical gradient refractive index distribution.

* * * * *